United States Patent [19]

Moffett

[11] Patent Number: 6,033,525

[45] Date of Patent: Mar. 7, 2000

[54] MODIFIED CATIONIC STARCH COMPOSITION FOR REMOVING PARTICLES FROM AQUEOUS DISPERSIONS

[76] Inventor: Robert Harvey Moffett, 6 Crossan Ct., Landenberg, Pa. 19350

[21] Appl. No.: 09/176,674

[22] Filed: Oct. 21, 1998

Related U.S. Application Data

[63] Continuation-in-part of application No. 09/059,556, Apr. 14, 1998, abandoned, which is a continuation-in-part of application No. 08/960,648, Oct. 30, 1997, Pat. No. 5,859,128.

[51] Int. Cl.$^7$ .......................... D21H 17/28; D21H 17/29; D21H 17/41; D21H 17/42; D21H 17/44

[52] U.S. Cl. .................. 162/175; 162/181.1; 162/181.4; 162/181.5; 106/238; 525/54.2; 525/54.24; 525/54.26

[58] Field of Search ................................ 162/175, 181.1, 162/181.4, 181.5; 106/238; 525/54.2, 54.24, 54.26

[56] References Cited

U.S. PATENT DOCUMENTS

| | | | |
|---|---|---|---|
| 4,066,495 | 1/1978 | Voigt et al. | 162/168 NA |
| 4,388,150 | 6/1983 | Sunden et al. | 162/175 |
| 4,643,801 | 2/1987 | Johnson | 162/164.1 |
| 4,954,220 | 9/1990 | Rushmere | 162/168.3 |
| 5,176,891 | 1/1993 | Rushmere | 423/328.1 |
| 5,178,730 | 1/1993 | Bixler et al. | 162/168.3 |
| 5,482,693 | 1/1996 | Rushmere et al. | 423/328.1 |

FOREIGN PATENT DOCUMENTS

| | | |
|---|---|---|
| 60-126398 | 7/1985 | Japan . |
| 2-14096 | 1/1990 | Japan . |
| 06166986 | 6/1994 | Japan . |
| 1 77 512 | 1/1970 | United Kingdom . |
| WO 91/07543 | 5/1991 | WIPO . |

OTHER PUBLICATIONS

Hashimoto Ken et al., Dispersions of paper–strengthening agents imparting good retention of fillers and additives, *Chemical Abstracts*, vol. 111, No. 2, Jul. 10, 1989.

*Primary Examiner*—Nathan M. Nutter

[57] ABSTRACT

Modified starches prepared by cooking an amphoteric or cationic starch and certain polyacrylamides have improved performance in paper making if a soluble aluminum compound also is present.

10 Claims, No Drawings

MODIFIED CATIONIC STARCH COMPOSITION FOR REMOVING PARTICLES FROM AQUEOUS DISPERSIONS

CROSS-REFERENCE TO RELATED APPLICATION

This application is a continuation-in-part of application Ser. No. 09/059,556, filed Apr. 14, 1998 and now abandoned, which is a continuation-in-part of application Ser. No. 08/960,648, filed Oct. 30, 1997 and now U.S. Pat. No. 5,859,128.

BACKGROUND OF THE INVENTION

1. Field of the Invention

This invention relates to compositions obtained by cooking a cationic or amphoteric starch and a cationic, anionic, nonionic, or amphoteric polyacrylamide. The resulting modified starch compositions have general utility as a clarifying aid for removing solids from an aqueous dispersion, and have special utility as a retention aid in the manufacture of paper.

2. Background of the Prior Art

Paper production involves the formation and dewatering of a web primarily composed of cellulose fibers and inorganic filler. The web is formed by spreading an aqueous suspension containing the cellulose fibers and inorganic filler over a wire or net, and then removing water to form a fiber web or sheet. The aqueous suspension is referred to as "paper furnish" in the trade, and the removed water is referred to as "white water."

The industry long has sought ways to reduce the percentage of small cellulose fibers and filler particles that are removed with the white water as the paper web is formed. Not only does this represent a loss of material, but it also contributes to a build-up of material in the white water known as "anionic trash" that impairs efficient operation of the equipment. Thus, improved retention of the smaller particles not only makes water removal easier, but also improve yield and productivity of the paper-making process.

Many additives have been suggested in the prior art for improving fines retention and wet-end drainage. Cationic starches frequently are used for this purpose, particularly the relatively expensive cationic potato and waxy maize starches. Less expensive cationic corn starch has been used, but it generally does not provide adequate fines retention and wet-end drainage.

Many suggestions are made in the prior art concerning improvements to the efficiency of cationic starch for this purpose. PCT application WO 91/07543 published May 30, 1991, for example, proposes that a cationic starch, a cationic polyacrylamide, and a polymeric silicic acid may be added to the cellulose suspension to improve fines retention and dewatering. The addition of large quantities of polyacrylamide, however, not only adds substantial costs to the paper-making process, but also may overflocculate the paper furnish, resulting in poor paper formation.

Thus, there is an ongoing need for additives to improve fines retention and wet-end drainage in the manufacture of paper.

SUMMARY OF THE INVENTION

It now has been found that amphoteric and cationic starches exhibit improved performance as a retention additive in the manufacture of paper if the starches are cooked with a cationic, anionic, nonionic, or amphoteric polyacrylamide and added to paper furnish containing certain aluminum compounds. Accordingly, the invention provides a paper furnish containing:

(a) a soluble aluminum compound present in the amount of approximately 0.005 to 2.5 kilograms of $Al_2O_3$ per metric ton of dry paper, and (b) a modified starch prepared by cooking an aqueous solution of at least one amphoteric or cationic starch having a degree of substitution between about 0.01 to 0.2 with at least one nonionic or amphoteric polyacrylamide, or cationic or anionic polyacrylamide having a degree of substitution between 1% and 80% by weight, having a molecular weight of at least 500,000, with the provisos that:

(i) cooking is conducted at a pH above 7.0 in the case that a cationic or nonionic polyacrylamide is selected;

(ii) cooking produces no more than 75% neutralizing of the cationic starch in the case that an amphoteric or anionic polyacrylamide is selected; and (iii) the weight ratio of starch to polyacrylamide is greater than about 2 to 1.

DETAILED DESCRIPTION OF THE PREFERRED EMBODIMENTS

The modified starches improve fines retention and wet-end drainage in the paper-making process, while allowing the selection of less expensive or reduced amounts of certain additives. More specifically, it has been found that cationic, or amphoteric starches, when cooked with a cationic, anionic, nonionic, or amphoteric polyacrylamide, improve fines retention, when used in conjunction with certain aluminum compound, over that achieved by separately adding the starch and polyacrylamide during the paper-making process.

Starch

The cationic starch may be any of those previously used in papermaking. The cationic starch may be derived from any of the common starch producing materials such as corn starch, potato starch, waxy maize starch and wheat starch. Cationization is achieved by any of the commercially known procedures, such as the addition of 3-chloro-2-hydroxypropyltrimethylammonium chloride to obtain cationic starches with various degrees of nitrogen substitution. The degree of cationic substitution on the starches (wt. % nitrogen/starch) can range from about 0.01 to about 0.2, preferably between 0.02 and 0.15. Naturally occurring amphoteric starches, such as potato starch, or synthetic amphoteric starches, also may be selected.

Polyacrylamide (PAM)

The PAM is nonionic, amphoteric, anionic or preferably cationic, having a molecular weight of at least 500,000, preferably at least 1,000,000.

The cationic and amphoteric PAM may have a degree of cationic substitution by weight from 1% to about 80%, preferably from 10% to about 40%. By "degree of substitution" it is meant that the polymers contain randomly repeating monomer units containing chemical functionality which, when dissolved in water, become cationically charged. These monomer units include, but are not limited to, groups such as amine groups. The PAM may be a solid, powder form, micro-bead form, a water-in-oil emulsion or any other commercially known form. Suitable PAM can be obtained from Allied Colloids, Suffolk Va. and from Nalco, Naperville Ill., as well as other sources.

It has been found anionic PAM should have a molecular weight of between 500,000 and 20,000,000 more preferable between 1,000,000 and 15,000,000. The anionic PAM should have a level of anionicity ranging from about 1 to 80 wt % and more preferably 2 to 70 wt %. In general low anionicity PAMs will produce higher levels of ash retention by allowing more PAM to be cooked with the starch before exceeding 75% neutralization of the starch's charge. It has also been found that in general higher molecular weight PAMs will produce higher levels of ash retention.

The anionic PAM contains carboxylate, sulfonate, or other common anionic groups in lieu of the amine or other cationic groups contained in cationic PAM. As an example, a copolymer of acrylamide and acrylic acid wherein the acrylamide/acrylic acid monomer weight ratio is 90/10 would have a degree of substitution of 10%. The PAM may be in solid, powder form, micro-bead form, a water-in-oil emulsion or any other commercially known form. Suitable PAM can be obtained from Allied Colloids, Suffolk, Va., and from Nalco, Naperville, Ill., as well as other sources.

Cooking

The starch and PAM may be dry blended together or blended as a slurry or slurries in water before being cooked, or they may be blended during the starch cooking process. Rather than blending dry or slurried PAM, the PAM may instead be prehydrated before being blended and cooked with the starch. Rather than blending dry or slurried starch, the starch may instead be cooked, blended with the PAM, and then recooked.

Cooking conveniently is accomplished using a starch cooker at the paper mill. A batch cooker or continuous cooker, such as a jet cooker, may be selected. Continuous jet cooking typically is conducted at temperatures from about 80 to 130° C. at 1 atmosphere or higher pressure. The solids content during cooking generally is less than 15%, but higher solids concentrations may be used if adequate mixing can be accomplished.

Selected cooking times and temperatures will vary with the composition and equipment. Cooking conditions must be sufficient to gelatinize the starch and for the PAM to at least partially hydrate and react with the starch. Elevated temperatures above 65° C., preferably 80° C. to 100° C., typically will be selected for this purpose although temperatures below 65° C. may be selected for some compositions and cooking equipment. For example, advantages of the invention have been observed at cooking temperatures as low as 60° C. Temperatures above 100° C. may be selected if decomposition of the starch and PAM is prevented. Thus, batch cooking can be selected in practicing the invention, at pressures greater than one atmosphere, to employ a cooking temperature higher than 100° C. and as high as 130° C., or higher. The selected cooking time typically will be in the range of a few minutes to less than an hour. Longer cooking times generally are required for lower cooking temperatures.

When using cationic or nonionic PAM, best results are obtained if the starch/PAM mixture is cooked at a pH above 7, although some improvement in ash retention is also found at a pH below 7. The preferred cooking pH for either cationic or nonionic PAM and starch is from about 8 to about 10.5. pH is not critical when an anionic or amphoteric PAM is selected, but typically will be in the range of 3 to 11.

Cooking pH may be adjusted with conventional acids, bases, or salts. Use of alkaline aluminum compounds, such as sodium and potassium aluminate, have been found to be particularly useful for this purpose as these compounds also boost retention performance, as illustrated in Example 6. Surprisingly, retention performance is thereby improved even in acid paper furnishes. Further, it has been found that inclusion of the alkaline aluminum compound in the cooking solution results in a modified starch that permits use of a non-aluminized microparticulate retention aid in acidic paper furnishes, to further improve retention performance, whereas these non-aluminized retention aids typically do not perform well in acidic paper furnishes.

The weight ratio of PAM to starch will vary with the selected ingredients, and the extent to which improvements are desired in fines retention and wet end drainage. For example, it has been found that poor-performing corn starch may be improved to the extent that it is equal or superior to the more expensive potato starch by cooking the corn starch with as little as 1% PAM, by weight. Typically, the selected weight ratio of starch to PAM will be greater than 2 to 1, preferably greater than 5 to 1. The amount of PAM added to the starch should be limited below that which would cause the starch to precipitate, which will vary with the ingredients and cooking process that is selected. If anionic or amphoteric PAM is selected, it is critical that cooking conditions (i.e., degree of PAM anionicity, ratio of PAM to starch, cationicity of the starch) are limited such that no more than 75% of the starch charge is neutralized. Otherwise performance deteriorates.

Paper Making

The cooked starch/PAM composition may be added to any suitable paper furnish as a retention aid to improve fines retention and wet end drainage. The paper furnish may contain a variety of wood pulp and inorganic fillers, and typically has a pH of about 4 to 10. Thus bleached kraft pulp, thermomechanical, chemical-thermomechanical and groundwood pulps may be used together with clays, precipitated or ground calcium carbonate, titanium dioxide and other inorganic fillers if desired. Such fillers typically are used at the 15% to 20% loading level, as a weight percent of the total paper weight, but may reach levels as high as 30%, or higher, for some specialty applications.

In accordance with the invention, the cooked PAM/starch composition is added to a paper furnish containing certain aluminum compounds, or to which those compounds are subsequently added. The aluminum compound boosts performance of the cooked PAM/starch. The aluminum compound generally is present in dissolved form in the paper furnish, and may be added as a solution or particulate solid. Preferably, the aluminum compound is added first, then the cooked PAM/starch composition.

Aluminum sulfate, aluminates (e.g., sodium or potassium aluminate), aluminum nitrate, polyaluminum chloride, or polyaluminum sulfate may be selected to advantage. Other aluminum compounds soluble in the paper furnish also may be selected. The dose rate typically is in the range of 0.01 to about 5 pounds $Al_2O_3$ per ton of dry paper (0.005 to 2.5 kilograms per metric ton).

Particularly advantageous results are obtained when the paper furnish also contains an anionic inorganic colloid, as is conventional in the paper-making industry. Thus the furnish may contain, for example, montmorillonite, bentonite, silica sols, aluminum modified silica sols, aluminum silicate sols, polysilicic acid, polysilicate microgels and polyaluminosilicate microgels, separately or in combination.

The paper furnish also may contain other typical additives, such as size, cationic polymers (retention aids and flocculents), anionic polymers, and/or separate additions of starch. While the above ingredients may be added in any order with good results, the preferred order of addition is to add the alumina compound first, the cooked/PAM of this invention next, and then an inorganic anionic colloid.

While the invention has been described in detail as applied to paper-making, it will be appreciated that the compositions also have utility as clarifying aids to remove solids from aqueous suspensions.

The invention now will be exemplified, but not limited, by the following Examples.

For consistency, in all examples the performance of the test solutions was measured as retention aids in a 5 gram/liter paper furnish composed of 35% bleached kraft hardwood, 35% bleached kraft softwood, and 30% precipitated calcium carbonate (PCC). The furnish pH was 8.0. The furnish was mixed in Britt Jar equipped with a 50R screen (100 mesh) at 750 RPM. Ash retention's were determined from the white water sample by following Tappi Standard T-261.

EXAMPLE 1

This example demonstrates how cooking cationic starch and cationic PAM together yields better retention than adding the same two chemicals separately but simultaneously to the paper furnish. A dry blend was prepared by mixing 3.0 grams of Stalok 300 cationic corn starch from Staley Starch with 0.04 grams of cationic PAM "A" having a molecular weight of about 4,000,000 and a degree of substitution of 22 wt. %. This blend was added to 497 grams of deionized water and the pH adjusted to 8.5 using sodium hydroxide. The solution was heated on a hot plate stirrer for 30 minutes and began to boil at about 15 minutes into the cooking cycle. After cooking the solution was removed from the hot plate and allowed to cool. The solution was reweighed and any water which evaporated was replaced.

A second dry blend was prepared by mixing 3.0 grams of BMB-40 cationic potato starch from Akzo Nobel with 0.04 grams of PAM "A". To this blend was added 497 grams deionized water and the pH was adjusted to 8.5 and cooked following the method described above.

As comparisons, samples of Stalok 300 corn starch and BMB-40 potato starch were prepared as 0.5 wt % solutions following the cooking procedure above. The pH of these starch solutions was not adjusted. A 0.125 wt. % sample of PAM "A" was separately prepared by adding 1 gram of PAM "A" to 799 grams of deionized water and mixing the resulting solution for 1 hour.

Starch and PAM were separately added to the furnish at a dose rate of 15 lb/ton (7.5 kg/tonne) and 0.25 lb/ton (0.125 kg/tonne) respectively. In this and following U.S. Pat. No. 5,482,693 was added to the furnish in some tests. The order of chemical addition was:

| Time (sec) | Step |
|---|---|
| 00 | Start mixer |
| 15 | Add starch; add PAM |
| 30 | Add PAS |
| 45 | Open Britt Jar drain valve |
| 50 | Begin collecting white water |
| 80 | Stop collection white water |

The ash retention results are shown in Table 1.

TABLE 1

% Ash Retention vs. Addition Procedure and PAS Dose

| PAS Dose (Kg SiO$_2$/Tonne) | Separate Add'n Corn Starch + PAM | Cooked both Corn Starch + PAM | Separate Add'n Potato Starch + PAM | Cooked both Potato Starch + PAM |
|---|---|---|---|---|
| 0 | 17% | 27% | 21% | 25% |
| 0.5 | 27% | 39% | 40% | 47% |
| 1.0 | 28% | 44% | 47% | 56% |

The results clearly show that ash retention is markedly improved by cooking cationic starch and cationic PAM together at pH 8.5 before adding these chemicals to the paper furnish, and that the ash retention increases with higher doses of PAS. Especially significant from a cost-of-ingredient standpoint, the performance of corn starch and PAM when cooked together was essentially equivalent to that of the much more expensive potato starch/PAM combination when separately added as in prior art.

EXAMPLE 2

This example demonstrates the need to cook the cationic starch and cationic PAM together rather than simply mixing them at lower temperatures.

Sample A was prepared by mixing 3.0 grams of Stalok 300 with 497 grams of deionized water and adjusting the pH to 8.5. The solution was cooked using the cooking procedure described in Example 1. After the sample had cooled to 35° C., 0.04 grams of PAM "A" was added and the resulting solution was mixed for 1 hour before testing.

Sample B was prepared by mixing 3.0 grams of Stalok 300 with 497 grams of deionized water and adjusting the pH to 8.5. The solution was cooked using the cooking procedure described in Example 1. After the sample had cooled to 95° C., 0.04 grams of PAM "A" was added and the resulting solution was mixed for 1 hour before testing.

Sample C was prepared by blending 3.0 grams of Stalok 300 with 0.04 grams of PAM "A", then adding 497 grams of deionized water and adjusting the pH to 8.5. The solution was cooked using the cooking procedure described in Example 1.

Table 2 below shows the ash retention results. In this table, the pH of the starch solution or starch/PAM solution before cooking is labeled as "a:pH". The pH after cooking was also measured, and is labeled as "b:pH".

TABLE 2

% Ash Retention vs. Cooking/Mixing Procedure and PAS Dose

| | Stalok 300 and PAM "A" | | |
|---|---|---|---|
| PAS Dose (Kg SiO$_2$) Tonne) | Sample A a: pH = 8.5 b: pH = 7.0 | Sample B a: pH = 8.5 b: pH = 8.1 | Sample C a: pH = 8.5 b: pH = 9.2 |
| 0 | 25% | 29% | 36% |
| 0.5 | 39% | 44% | 55% |

The results also show that cooking the cationic starch alone at pH above 8.5 and then mixing with PAM at 35° C. (mixed Sample A) or 95° C. (mixed Sample B) is much less beneficial for improving ash retention than cooking them together in accordance with the inventive process (cooked Sample C.)

EXAMPLE 3

This example demonstrates that the pH when cooking cationic starch and cationic PAM together has a significant effect on the improved retention. First, 3.0 gram samples of Stalok 300 corn starch were dry blended with 0.04 grams of various types of cationic PAM and then dispersed in 497 grams of deionized water. Cationic PAM "B" has a molecular weight of about 7,000,000 and a degree of substitution of 22 wt. %. Cationic (liquid) PAM "C" has a molecular weight of about 4,000,000 and a degree of substitution of 22 wt. %. Since PAM "C" has an active ingredient content of 50%, 0.08 grams was added in this case. The pH of the starch/PAM solutions were then adjusted to the values shown in Table 3 (labeled as "a:pH"). and cooked following the cooking procedure described in Example 1. NA means the pH was not adjusted. The pH after cooking was also measured, and is labeled as "b:pH".

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish in some tests. Order of addition of the chemicals was the same as Example 1. The results are shown in Table 3.

TABLE 3

% Ash Retention vs. pH Adjustment and PAS Dose

A. Stalok 300 and PAM "A"

| PAS Dose (Kg $SiO_2$/Tonne) | a: pH = NA b: pH = 4.9 | a: pH = 7.0 b: pH = 6.4 | a: pH = 8.5 b: pH = 8.0 | a: pH = 10.0 b: pH = 9.7 |
|---|---|---|---|---|
| 0 | 22% | 25% | 30% | 29% |
| 0.5 | 30% | 37% | 44% | 47% |
| 1.0 | 31% | 40% | 43% | 48% |

B. Stalok 300 and PAM "B"

| PAS Dose (Kg $SiO_2$/Tonne) | a: pH = NA b: pH = 5.1 | a: pH = 7.0 b: pH = 6.9 | a: pH = 8.5 b: pH = 8.9 | a: pH = 10.0 b: pH = 10.1 |
|---|---|---|---|---|
| 0 | 20% | 28% | 32% | 30% |
| 0.5 | 29% | 46% | 42% | 51% |

C. Stalok 300 and PAM "C"

| PAS Dose (Kg $SiO_2$/Tonne) | a: pH = NA b: pH = 5.4 | a: pH = 7.5 b: pH = 7.0 | a: pH = 8.5 b: pH = 9.0 | a: pH = 10.0 b: pH = 10.0 |
|---|---|---|---|---|
| 0 | 22% | 27% | 27% | 30% |
| 0.5 | 29% | 45% | 46% | 44% |
| 1.0 | 33% | 44% | 48% | 43% |

The results clearly show how retention is improved by cooking cationic starch and cationic PAM together at pH above 5.5.

EXAMPLE 4

This example demonstrates that cationic starch blended and cooked with prehydrated cationic PAM at pH 8.5 also improves retention. A sample of 0.125% cationic PAM was prepared by adding 1.0 grams of PAM "B" to 799 grams of deionized water. The solution was allowed to hydrate for 1 hour. Then 33.3 grams of this 0.125% PAM solution was mixed with 464 grams of deionized water and 3.0 grams of Stalok 300. The pH was then adjusted to 8.5 and the solution was cooked following the cooking procedure described in Example 1. A second starch/PAM blend was prepared by dry blending 0.04 grams of PAM "B" with 3 grams of Stalok 300 and then adding the dry blend to 497 grams of deionized water. The pH was adjusted to 8.5 and cooked following the procedure described in Example 1.

The performance of the above solutions was tested as a retention aid as before. Starch and PAM were added to the furnish at a dose rate of 15 lb/ton (7.5 kg/tonne) and 0.25 lb/ton (0.125 kg/tonne), respectively. PAS prepared as in Example 1 was added to the furnish in some tests. Order of addition of the chemicals was the same as in Example 1. A test was also conducted where the Stalok 300 cationic corn starch and prehydrated PAM "B" were added separately but simultaneously to the paper furnish.

TABLE 4

% Ash Retention vs. PAM Hydration and PAS Dose

| PAS Dose (Kg $SiO_2$/Tonne) | Separate Add'n Corn Starch + Prehydr. PAM | Cooked both Corn Starch + Dry PAM | Cooked both Potato Starch + Prehydr. PAM |
|---|---|---|---|
| 0 | 23% | 36% | 37% |
| 0.5 | 37% | 51% | 51% |
| 1.0 | 44% | 53% | 50% |

The results shown in Table 4 clearly indicate that cooking cationic starch with prehydrated cationic PAM at pH 8.5 provides the same level of ash retention as cooking the dry blended starch and PAM. Both methods provide superior results to adding the same chemicals separately to the paper furnish.

EXAMPLE 5

This example demonstrates that the addition of an aluminum compound to the papermaking furnish boosts the performance of the cationic starch/cationic PAM blend. A dry blend was prepared by mixing 3.0 grams of Stalok 300 cationic corn starch from Staley Starch with 0.04 grams of cationic PAM "A". To this blend was added 497 grams of deionized water. The pH was adjusted to 8.6. The solution was heated on a hot plate stirrer for 30 minutes and began to boil about 15 minutes into the cooking cycle. After cooking the solution was reweighed and any water which evaporated was replaced. The final pH of the solution was 7.1.

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish at 2 lb/ton (1 kg/tonne). Papermaker's alum and sodium aluminate were also added to the furnish in some tests. The order of addition was:

| Time (sec) | Step |
|---|---|
| 00 | Start mixer |
| 15 | Add aluminum compound |
| 30 | Add starch; add PAM |
| 45 | Add PAS |
| 60 | Open Britt Jar drain valve |
| 65 | Begin collecting white water |
| 95 | Stop collecting white water |

TABLE 5

% Ash Retention vs. Aluminum Addition Step

| Aluminum Type | Aluminum Dose lb/ton | kg/tonne | Ash Retention |
|---|---|---|---|
| None | 0 | 0 | 61% |
| Alum | 0.5 | 0.25 | 64% |
| Alum | 1.0 | 0.5 | 68% |
| Alum | 2.0 | 1.0 | 72% |
| Sodium Aluminate | 0.5 | 0.25 | 72% |
| Sodium Aluminate | 1.0 | 0.5 | 72% |
| Sodium Aluminate | 2.0 | 1.0 | 73% |

The results show that retention is further improved by adding an aluminum compound to the paper furnish.

EXAMPLE 6

This example demonstrates how using an alkaline aluminum compound to adjust the cationic PAM to pH above 7 before cooking boosts the blend's performance as a retention aid. Dry blends were prepared by mixing 3.0 grams of Stalok 300 cationic corn starch with 0.04 grams of PAM "B" and various amounts of sodium aluminate as listed for Samples D through G in Table 7. To these blends was added 497 grams of deionized water. The pH in the blend containing no sodium aluminate was adjusted to 8.5. The pH in the blends containing sodium aluminate was measured but not adjusted and is labeled as "a:pH ". The solution was heated on a hot plate stirrer for 30 minutes and began to boil about 15 minutes into the cooking cycle. After cooking, the solution was reweighed and any water which had evaporated was replaced. The pH of the solution was again measured and is labeled as "b:pH".

The performance of the above solutions was tested as retention aids as before. Starch and PAM were separately added to the furnish at a dose rate of 15 lb/ton (7.5 kg/tonne) and 0.25 lb/ton (0.125 kg/tonne) respectively. PAS prepared as in Example 1 was added to the furnish in some tests. The order of chemical addition was the same as in Example 1.

TABLE 6

% Ash Retention vs. Cooking Procedure and PAS Dose

A. Method of Preparing Samples

|  | Sample D | Sample E | Sample F | Sample G |
|---|---|---|---|---|
| gm Sodium Aluminate Added: | 0 | 0.09 | 0.17 | 0.35 |
| a: pH | 8.5 | 9.1 | 9.6 | 10.1 |
| b: pH | 8.9 | 9.3 | 9.5 | 9.8 |

B. Retention Test Results

| PAS Dose (Kg SiO$_2$/Tonne) | Sample D | Sample E | Sample F | Sample G |
|---|---|---|---|---|
| 0 | 27% | 34% | 34% | 35% |
| 0.5 | 48% | 56% | 60% | 64% |

The results clearly show the benefit to using an alkaline aluminum compound to adjust the pH of the cationic starch/cationic PAM blends.

EXAMPLE 7

This example demonstrates how cooking cationic starch and nonionic PAM together at pH 10 yields better retention than adding the same two chemicals separately but simultaneously to the paper furnish. A dry blend was prepared by mixing 3.0 grams of Stalok 300 cationic corn starch from Staley Starch with 0.04 grams of nonionic PAM "D", having a molecular weight of about 14,000,000. To this blend was added 497 grams of deionized water. The pH was adjusted to 10.1. The solution was heated on a hot plate stirrer for 30 minutes and began to boil about 15 minutes into the cooking cycle. After cooking the solution was reweighed and any water which evaporated was replaced. The final pH of the solution was 9.9.

As a comparison, a sample of Stalok 300 was prepared as a 0.5 wt % solution following the procedure above. The solution pH was found to be 7.5 and was not adjusted.

A 0.125 wt. % solution of PAM "D" was prepared by adding 1 gram of PAM "D" to 799 grams of deionized water and mixing the resulting solution for 1 hour. The solution pH was found to be 4.4 and was not adjusted.

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish in some tests. The order of addition was the same as in Example 1.

TABLE 7

% Ash Retention vs. Cooking Procedure and PAS Dose

| PAS Dose (Kg SiO$_2$/Tonne) | Separate Add'n Corn Starch + Nonionic PAM | Cooked both Corn Starch + Nonionic PAM |
|---|---|---|
| 0 | 11% | 22% |
| 0.5 | 19% | 33% |
| 1.0 | 22% | 33% |

The results clearly show retention is improved by cooking cationic starch and nonionic PAM together at pH 10 before adding these chemicals to the paper furnish.

EXAMPLES 8 THROUGH 12

In the following Examples 8 through 12, charge demand of the cationic starch/anionic PAM blends was determined using a Rank Brothers Charge Analyser II (Cambridge, England) streaming current detector. The charge demand of the base cationic starch and the cationic starch/PAM blends were determined at pH 8 by titrating 1.25 grams of the starch/PAM blends in 225 ml deionized water with 0.001N Poly(vinylsulfonic acid, sodium salt) solution. If the charge on the starch/PAM blends was determined to be anionic the percentage of the starch's charge neutralized was reported as greater than 100%.

EXAMPLE 8

This example was conducted with paper furnishes containing either Papermaker's alum solution [$Al_2(SO_4)_3$ .18 $H_2O$] or sodium aluminate. The example demonstrates that when cooking cationic potato starch with a high molecular weight (MW) anionic PAM, the anionic PAM must neutralize less than about 50% of the cationic starch's charge for the performance of the cooked starch/PAM solution to exceed that exhibited by adding the same chemicals separately to the paper furnish.

The cationic starch/anionic PAM blends were prepared by cooking 2.5 grams of Stalok 410 cationic potato starch (available from Staley Starches) molecular weight of approximately 8,000,000 and 12 wt % anionicity in deionized water. The total mass of the starch/PAM solutions was 500 grams. The anionic PAM was prehydrated at 0.125 wt % (active basis) prior to being mixed and cooked with the cationic starch and additional water. The starch/PAM blends were heated on a magnetically stirred hot plate for 30 minutes and began to boil at approximately 20 minutes into the cooking cycle.

Retention experiments were conducted using 15 lb/t cationic potato starch and various dose rates of anionic PAM. 2 lb/t ($SiO_2$ basis) of 4 nm colloidal silica sol (available from Nalco) was added 15 seconds after the simultaneous addition of the cationic starch and the anionic PAM.

The results show the cooking together of the cationic starch and high MW anionic PAM produce superior ash retentions in furnishes containing alumina compared to adding the same chemicals separately only when less than about 50% of the starch's charge is neutralized by the anionic PAM. Results are recorded in Table 8.

TABLE 8

% Ash Retention vs. PAM Dose and Aluminum Type

Ash Retention %

| % Cat Starch Charge Neutralized | PAM Dose (lb/t) | Starch/PAM wt ratio | 0.5 lb/t Al2O3 (as Alum) | | 1 lb/t Al2O3 (as Alum) | | 0.5 lb/t Al2O3 (as Sodium Aluminate) | |
|---|---|---|---|---|---|---|---|---|
| | | | Separate/Simultaneous Addition | Cooked Together | Separate/Simultaneous Addition | Cooked Together | Separate/Simultaneous Addition | Cooked Together |
| 11 | 0.25 | 60/1 | 47 | 70 | 52 | 70 | 55 | 79 |
| 25 | 0.5 | 30/1 | 49 | 55 | 58 | 59 | 61 | 68 |
| 53 | 0.75 | 20/1 | 59 | 46 | 57 | 45 | 63 | 48 |

EXAMPLE 9

This example was conducted with a paper furnish containing 0.5 lb/t $Al_2O_3$ added as Papermaker's alum solution. The example demonstrates that when cooking cationic potato starch with a low molecular weight (MW) anionic PAM, the anionic PAM can neutralize up to about 75% and still provide superior ash retention than exhibited by adding the same chemicals separately to the paper furnish.

The cationic starch/anionic PAM blends were prepared by cooking 2.5 grams of BMB-40 cationic potato starch having a degree of substitution of 0.04 with a commercial anionic PAM having a molecular weight of approximately 1,000,000 and 8 wt % anionicity in deionized water. The starch/PAM solutions total mass was 500 grams. The cationic starch and anionic PAM were added to deionized water as dry powders and were heated on a magnetically stirred hot plate for 30 minutes. The solution boiled at approximately 20 minutes into the cooking cycle.

Retention experiments were conducted using 20 lb/t cationic potato starch and various dose rates of anionic PAM. 2 lb/t ($SiO_2$ basis) of 4 nm colloidal silica sol (available from Nalco) were added 15 seconds after the simultaneous addition of the cationic starch and the anionic PAM.

The results show the cooking together of the cationic starch and low MW anionic PAM produce superior ash retentions in furnishes containing alumina compared to adding the same chemicals separately only when less than about 75% of the starch's charge is neutralized by the anionic PAM. Results are recorded in Table 9.

TABLE 9

% Ash Retention vs. Low MW PAM Dose

| % Cat Starch Charge Neutralized | PAM Dose (lb/t) | Starch/PAM wt. Ratio | Separate/Simultaneous Addition | Cooked Together |
|---|---|---|---|---|
| 22 | 0.7 | 30/1 | 38 | 40 |
| 48 | 1.3 | 15/1 | 35 | 41 |
| 55 | 2.7 | 7.5/1 | 34 | 54 |
| 73 | 4 | 3.8/1 | 29 | 50 |
| >100 | 5.3 | 2.8/1 | 32 | 21 |

EXAMPLE 10

This example was conducted with a paper furnish containing 0.5 lb/t $Al_2O_3$ added as Papermaker's alum solution. The example demonstrates the use of low "S value" silica sols with cationic potato starch cooked with a high molecular weight (MW) anionic PAM.

The cationic starch/anionic PAM blends were prepared by cooking 2.5 grams of Stalok 410 cationic potato starch with a commercial anionic PAM having a molecular weight of approximately 10,000,000 and 40 wt % anionicity in deionized water. The starch/PAM solutions total mass was 500 grams. The anionic PAM was prehydrated at 0.125 wt % (active basis) prior to being mixed and cooked with the cationic starch and additional water. The starch/PAM blends were heated on a magnetically stirred hot plate for 30 minutes and began to boil at approximately 20 minutes into the cooking cycle.

Retention experiments were conducted using 20 lb/t cationic potato starch and various dose rates of anionic PAM. 2 lb/t ($SiO_2$ basis) of either BMA-670 silica sol (available from Akzo Nobel) or 0.5 lb/t ($SiO_2$ basis) Particol BX silica sol (available from Allied Colloids) was added 15 seconds after the simultaneous addition of the cationic starch and the anionic PAM.

The results show the cooking together of the cationic starch and high MW anionic PAM produce superior ash retentions in furnishes containing alumina compared to adding the same chemicals separately only when less than about 50% of the starch's charge is neutralized by the anionic PAM. Results are recorded in Table 10.

TABLE 10

% Ash Retention vs. High MW
PAM Dose with Low S Value Silica Sols

| % Cat Starch Charge Neutralized | PAM Dose (lb/t) | Starch/ PAM wt ratio | 1 lb/t BMA-670 | | 0.5 lb/t Particol BX | |
|---|---|---|---|---|---|---|
| | | | Separate/ Simultaneous Addition | Cooked Together | Separate/ Simultaneous Addition | Cooked Together |
| 18 | 0.2 | 100/1 | 38 | 58 | 41 | 54 |
| 42 | 0.4 | 50/1 | 41 | 46 | 40 | 40 |
| 59 | 0.6 | 33/1 | 43 | 31 | 46 | 28 |
| 72 | 0.8 | 25/1 | 48 | 24 | 48 | 23 |

EXAMPLE 11

This example was conducted with a paper furnish containing 0.5 lb/t $Al_2O_3$ added as a polyaluminum chloride solution. The example demonstrates the use of colloidal silica sol and hydrated bentonite clay with cationic corn starch cooked with a high molecular weight (MW) anionic PAM.

The cationic starch/anionic PAM blends were prepared by cooking Stalok 300 cationic corn starch having a degree of substitution of 0.036 with a commercial anionic PAM having a molecular weight of approximately 8,000,000 and 5 wt % anionicity in deionized water. The starch/PAM solutions total mass was 500 grams. The anionic PAM was prehydrated at 0.125 wt % (active basis) prior to being mixed and cooked with the cationic starch and additional water. The starch/PAM blends were heated on a magnetically stirred hot plate for 40 minutes and began to boil at approximately 20 minutes into the cooking style.

Retention experiments were conducted using 20 lb/t cationic corn starch and various dose rates of anionic PAM. 2 lb/t ($SiO_2$ basis) of either 4 nm colloidal silica sol or 5 lb/t of hydrated bentonite clay (available from Allied Colloids) was added 15 seconds after the simultaneous addition of the cationic starch and the anionic PAM.

The results show that cooked together cationic starch and high MW anionic PAM produce superior ash retentions in furnishes containing alumina compared to adding the same chemicals separately up to the limit of the experiments conducted (34% of the starch's charge neutralized by the anionic PAM). Results are recorded in Table 11.

EXAMPLE 12

This example was conducted in an acid paper furnish composed of 40% bleached kraft hardwood, 40% bleached kraft softwood, and 20% clay. The furnish pH was adjusted to 4.0. 2 lb/t $Al_2O_3$ was added to the furnish as Papermaker's alum solution. The example demonstrates how an alkaline aluminum compound may be cooked with the cationic starch and anionic PAM to further improve ash retention.

The cationic starch/anionic PAM/alkaline alumina blends were prepared by cooking 2.5 grams of Stalok 410 cationic potato starch with 0.083 grams of a commercial anionic PAM having a molecular weight of approximately 8,000,000 and 12 wt % anionicity and 0.69 grams of $Al_2O_3$ as sodium aluminate in deionized water. The total mass of the (active basis) prior to being mixed and cooked with the cationic starch and additional water. The starch/PAM blends heated on a magnetically stirred hot plate for 40 minutes and began to boil at approximately 20 minutes into the cooking cycle. A cooked blend of only the cationic starch/anionic PAM (no $Al_2O_3$) was found to have neutralized 16% of the cationic starch's charge.

Retention experiments were conducted using 20 lb/t cationic corn starch, 0.67 lb/t of anionic PAM and 0.55 lb/t $Al_2O_3$ as sodium aluminate. 2 lb/t ($SiO_2$ basis) of surface aluminated 5 nm colloidal silica sol (BMA-9 available from Akzo Nobel) was added 15 seconds after the simultaneous addition of the cationic starch, the anionic PAM and the sodium aluminate.

The results show that cooked together cationic starch/ anionic PAM/alkaline alumina produce superior ash retentions compared to adding the same chemicals. Results are recorded in Table 12.

TABLE 11

% Ash Retention vs. High MW
PAM Dose and Anionic Inorganic Colloids

| | | | Ash Retention % | | | |
|---|---|---|---|---|---|---|
| % Cat Starch Charge Neutralized | PAM Dose (lb/t) | Starch/ PAM wt ratio | 2 lb/t 4 bn Colloidal Silica | | 5 lb/t Bentonite Clay | |
| | | | Separate/ Simultaneous Addition | Cooked Together | Separate/ Simultaneous Addition | Cooked Together |
| 27 | 0.75 | 27/1 | 34 | 51 | 27 | 37 |
| 34 | 1 | 20/1 | 35 | 49 | 28 | 37 |

TABLE 12

| | % Ash Retention with Combined Cooking | | | |
|---|---|---|---|---|
| % Cat Starch Charge Neutralized | PAM Dose (lb/t) | Starch/PAM wt. Ratio | Separate/ Simultaneous Addition | Cooked Together |
| 16 | 0.5 | 40/1 | 37 | 43 |

What is claimed is:

1. A paper furnish containing:
   (a) a soluble aluminum compound present in the amount of approximately 0.005 to 2.5 kilograms of $Al_2O_3$ per metric ton of dry paper, and
   (b) a modified starch prepared by cooking an aqueous solution of at least one amphoteric or cationic starch having a degree of substitution between about 0.01 to 0.2 with at least one nonionic or amphoteric polyacrylamide, or cationic or anionic polyacrylamide having a degree of substitution between 1% and 80% by weight, having a molecular weight of at least 500,000, with the provisos that:
      (i) cooking is conducted at a pH above 7.0 in the case that a cationic or nonionic polyacrylamide is selected;
      (ii) cooking produces no more than 75% neutralizing of the cationic starch in the case that an amphoteric or anionic polyacrylamide is selected; and
      (iii) the weight ratio of starch to polyacrylamide is greater than about 2 to 1.

2. The paper furnish of claim 1 wherein a cationic starch is cooked with a cationic acrylamide.

3. The paper furnish of claim 1 wherein a cationic starch is cooked with an anionic acrylamide.

4. The paper furnish of claim 1, 2 or 3 wherein the soluble aluminum compound is added to the furnish prior to addition of the modified starch.

5. The paper furnish of claim 1, 2 or 3 wherein the starch is selected from the group consisting of corn starch, potato starch, and waxy maize starch.

6. The paper furnish of claim 1, 2 or 3 wherein a colloidial silica is also present.

7. The paper furnish of claim 1, 2 or 3 wherein an anionic inorganic colloid is also present.

8. The paper furnish of claim 1, 2 or 3 wherein the soluble aluminum compound is selected from the group consisting of aluminum sulfate, aluminates, aluminum nitrate, polyaluminum chloride and polyaluminum sulfate.

9. The paper furnish of claims 1, 2 or 3 wherein the modified starch component (b) was prepared by cooking said aqueous solution at a temperature above 65° C.

10. The paper furnish of claims 1, 2 or 3 wherein the modified starch component (b) was prepared by cooking said aqueous solution at a temperature above 80° C.

* * * * *